US008863138B2

United States Patent
Sedayao et al.

(10) Patent No.: US 8,863,138 B2
(45) Date of Patent: Oct. 14, 2014

(54) APPLICATION SERVICE PERFORMANCE IN CLOUD COMPUTING

(75) Inventors: Jeffrey C. Sedayao, San Jose, CA (US); Vishwa Hassan, Chandler, AZ (US); Hong Li, El Dorado Hills, CA (US); Cindy A. Smith, Cameron Park, CA (US); Terry H. Yoshii, West Sacramento, CA (US); David W. Stone, Folsom, CA (US); Christian D. Black, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 12/976,516

(22) Filed: Dec. 22, 2010

(65) Prior Publication Data

US 2012/0167081 A1    Jun. 28, 2012

(51) Int. Cl.
| | | |
|---|---|---|
| *G06F 9/455* | (2006.01) | |
| *G06F 9/46* | (2006.01) | |
| *G06F 15/173* | (2006.01) | |
| *G06F 11/30* | (2006.01) | |

(52) U.S. Cl.
CPC ............ *G06F 11/30* (2013.01); *G06F 9/45558* (2013.01)
USPC ............... 718/104; 718/1; 718/100; 718/102; 718/105; 709/223; 709/224; 709/226

(58) Field of Classification Search
USPC ..................... 718/1, 100, 102, 103, 104, 106; 709/223, 224, 226
See application file for complete search history.

(56) References Cited

U.S. PATENT DOCUMENTS

| | | | |
|---|---|---|---|
| 7,523,190 B1* | 4/2009 | Bickerstaff et al. | 709/224 |
| 2007/0041330 A1* | 2/2007 | Bostica et al. | 370/252 |
| 2007/0083642 A1* | 4/2007 | Diedrich et al. | 709/224 |
| 2009/0265707 A1* | 10/2009 | Goodman et al. | 718/1 |
| 2010/0115049 A1* | 5/2010 | Matsunaga et al. | 709/216 |
| 2010/0235836 A1* | 9/2010 | Bratanov | 718/1 |
| 2011/0055389 A1* | 3/2011 | Bley | 709/224 |
| 2011/0126207 A1* | 5/2011 | Wipfel et al. | 718/104 |
| 2011/0148895 A1* | 6/2011 | Burckart et al. | 345/557 |
| 2011/0225299 A1* | 9/2011 | Nathuji et al. | 709/226 |
| 2011/0314520 A1* | 12/2011 | Olszewski et al. | 726/4 |
| 2012/0023492 A1* | 1/2012 | Govindan et al. | 718/1 |
| 2012/0047240 A1* | 2/2012 | Keohane et al. | 709/221 |
| 2012/0185913 A1* | 7/2012 | Martinez et al. | 726/1 |

* cited by examiner

*Primary Examiner* — Charles Swift

(74) *Attorney, Agent, or Firm* — Schwabe, Williamson & Wyatt, P.C.

(57) ABSTRACT

Methods and apparatuses associated with cloud computing are disclosed herein. In embodiments, a method may include receiving, by a service monitor operating on a computing device, performance information associated with services provided by an application service with instances operating on a plurality of virtual machines deployed on a plurality of servers of a computing cloud. The service monitor, in response, may identify one or more requests of the computing cloud to attempt to improve performance of the services provided by the application service. Other embodiments may be disclosed and claimed.

24 Claims, 4 Drawing Sheets

APPLICATION SERVICE PERFORMANCE IN CLOUD COMPUTING

TECHNICAL FIELD

Embodiments of the present disclosure relate to the field of data processing, in particular, to methods, apparatuses and articles associated with application service performance in cloud computing.

BACKGROUND

Unless otherwise indicated herein, the materials described in this section are not prior art to the claims in this application and are not admitted to be prior art by inclusion in this section.

With advances in electronics, integrated circuit, computing and networking technologies, cloud computing is increasingly popular. However, Cloud Computing's Infrastructure as a Service (IaaS) implementations are problematic when dealing with latency sensitive applications, in particular, when IaaS implementers statically allocate resources, such as virtual machines (VMs), and/or storage, e.g., by geographic areas. When operating conditions change, such as new users appearing in a different geographic area, an application service seeing usage spikes, or Internet network topologies reconfiguring, the application service owner may have to manually add or adjust resources to deal with these changing conditions.

BRIEF DESCRIPTION OF THE DRAWING

Embodiments of the present disclosure will be presented by way of exemplary embodiments, but not limitations, illustrated in the accompanying drawings in which like references denote similar elements, and in which.

DETAILED DESCRIPTION

Figure 1:
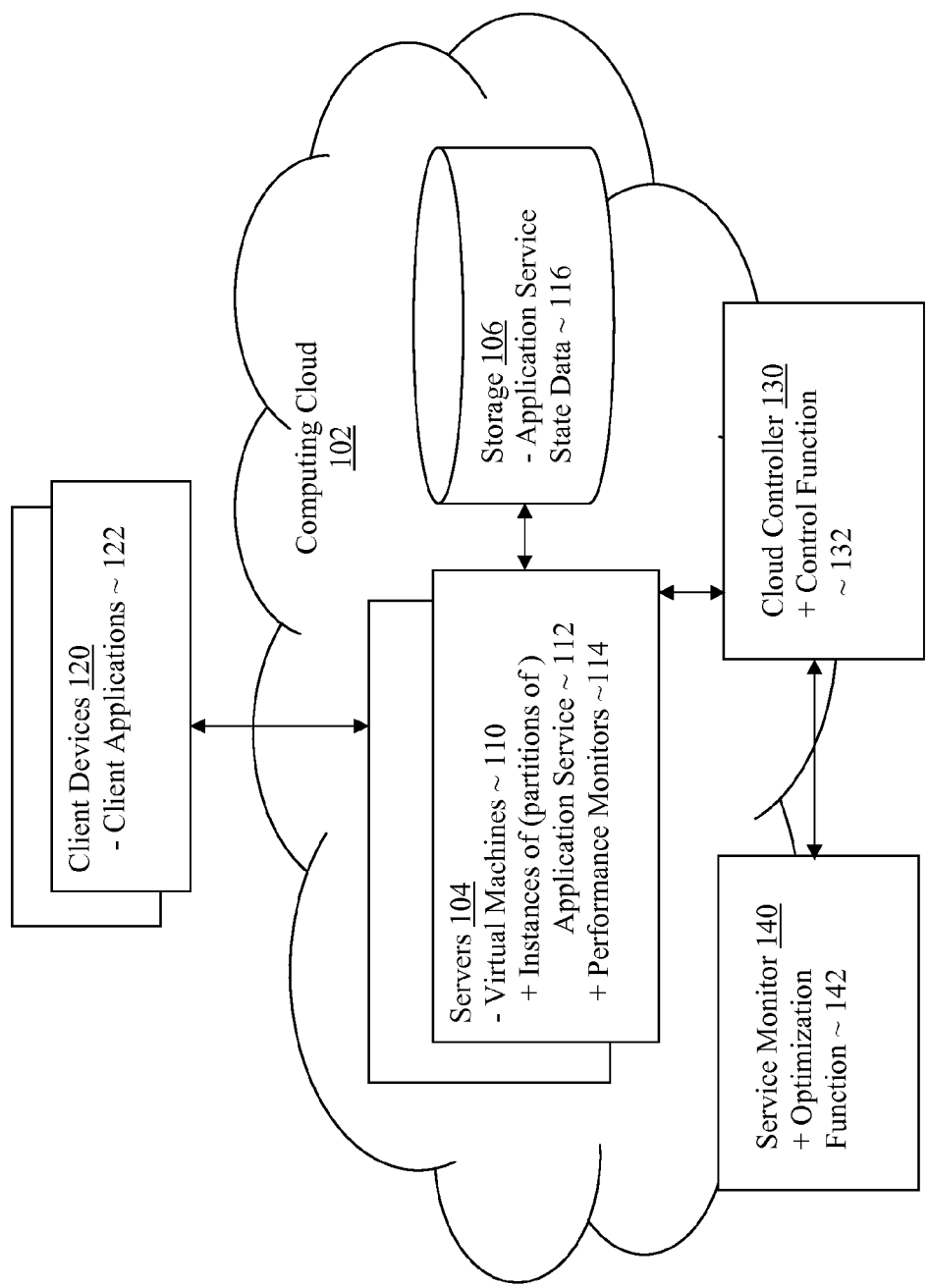
FIG. 1 illustrates an overview of a computing cloud.

Methods, apparatuses and articles of manufacture associated with application service performance in a computing cloud are disclosed herein. In embodiments, a method may include receiving, by a service monitor operating on a computing device, performance information associated with services provided by an application service with instances operating on a number of virtual machines deployed on a number of servers of a computing cloud. The service monitor, in response, may identify one or more requests for the computing cloud to attempt to improve performance of the service provided by the application service.

In various embodiments, the receiving operation may include receiving, by the service monitor, network latency information associated with different aspects of transactions serviced by the application service. The identifying operation may include identifying, by the service monitor, a request of the computing cloud to reroute transactions, previously routed to one of the instances of the application service to another one of the instances of the application service. Alternatively or additionally, the identifying operation may include identifying, by the service monitor, a request of the computing cloud to live migrate a virtual machine deployed on one of the servers of the computing cloud to another one of the servers of the computing cloud.

In various embodiments, the application service may include a number of partitions with different amounts of state information, and instance of the application service may include respective instances of the partitions of the application service. The receiving operation may include receiving performance information, by the service monitor, from respective performance monitors co-operating with the instances of the partitions of the application service on the virtual machines or the servers. The identifying operation may include identifying, by the service monitor, a request of the computing cloud to increase one or more computing resources allocated to one of the virtual machines hosting an instance of a partition of the application service. Alternatively or additionally, the identifying operation may include identifying, by the service monitor, a request of the computing cloud to newly deploy another virtual machine, using a pre-positioned image of at least a partition of the application service, in addition to the deployed virtual machines, to operate another instance of the application service, and to reroute transactions that otherwise would be routed to the existing instances of the application service to the newly deployed another instance of the application service.

In various embodiments, the method may further comprise performing, by the service monitor, optimization calculations for a performance objective function, subject to one or more resource or cost constraints, using the performance information received. The identifying operation may be performed based on a result of the optimization calculations. In various embodiments, the method may further comprise sending, by the service monitor, the one or more requests of the computing cloud, to a cloud controller of the computing cloud.

In various embodiments, apparatuses may be endowed with hardware and/or software configured to practice one or more aspects of the above described embodiments of the method of the present disclosure. In various embodiments, an article of manufacture with tangible, non-transitory computer-readable storage medium may be provided with programming instructions configured to cause an apparatus, in response to execution of the programming instructions by the apparatus, to practice one or more aspects of the above described embodiments of the method of the present disclosure.

Various aspects of the illustrative embodiments will now be further described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. A feature described in a parenthetical format denotes the feature as an optional feature, e.g., "an instance of (partitions of) an application service," denotes the application service may or may not be "partitioned."

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates an overview of a computing cloud incorporated with teachings of the present disclosure, in accordance with various embodiments. As illustrated, for the embodiments, computing cloud 102 may include a number of servers 104 and storage 106, coupled with each other directly, using e.g., cables (not shown), or indirectly, via one or more wired or wireless, local or wide area networks (not shown). Each server 104 may be configured to host one or more virtual machines 110. Each virtual machine 110 may be configured to host one or more instances of application service 112, or partitions thereof, to be described more fully below. Storage 106 may be employed to store state data 116 of application service 112. Each instance of application service 112 may be employed to service some client applications 122 operating on respective client devices 120. Client devices 120 may be selectively coupled with servers 104 via one or more wired or wireless, local or wide area networks (not shown). For the illustrated embodiments, computing cloud 102 may further include cloud controller 130 having controller functions 132 configured to control allocation of various hardware and or software resources of computing cloud 102, e.g., resources of servers 104, storage 106, and the networks coupling them, for deployment of virtual machines 110, application service 112, and performance monitors 114, and/or operating these elements.

In various embodiments, each virtual machine 110 may be further provided with a performance monitor 114 configured to observe, collect, and report performance information associated with the service provided to client applications 122, by the hosted instance or instances of (the partition(s)) of application service 112. In alternate embodiments, each server 102 may be provided with a performance monitor 114 configured to observe, collect, and report performance information associated with the service provided to client applications 122, by the instances of (the partition(s)) of application service 112 hosted by the virtual machines 110 deployed thereon, instead.

Additionally, computing cloud 102 may be provided with service monitor 140 having optimization function 142, configured to receive the performance information collected and reported by performance monitors 114, and in response, dynamically identifies and sends a number of resource adjustment requests to cloud controller 130 to adjust the deployments and/or allocation of the various hardware and/or software resources to the deployments of the various instances of (the partitions) of application service 112, to attempt to improve the performance of the service provided to client applications 122 by the instances of application service 112.

Application service 112 may be any one of a number of application services known in the art, including but are not limited to content distribution and/or e-commerce services. Similarly, servers 104, storage 106, cloud controller 130, service monitor 140, and the wired or wireless, local or wide area networks employed to couple the elements, except for the teachings of the present disclosure included therein, may be any one of a number of respective embodiments of these elements known in the art.

Figure 2:
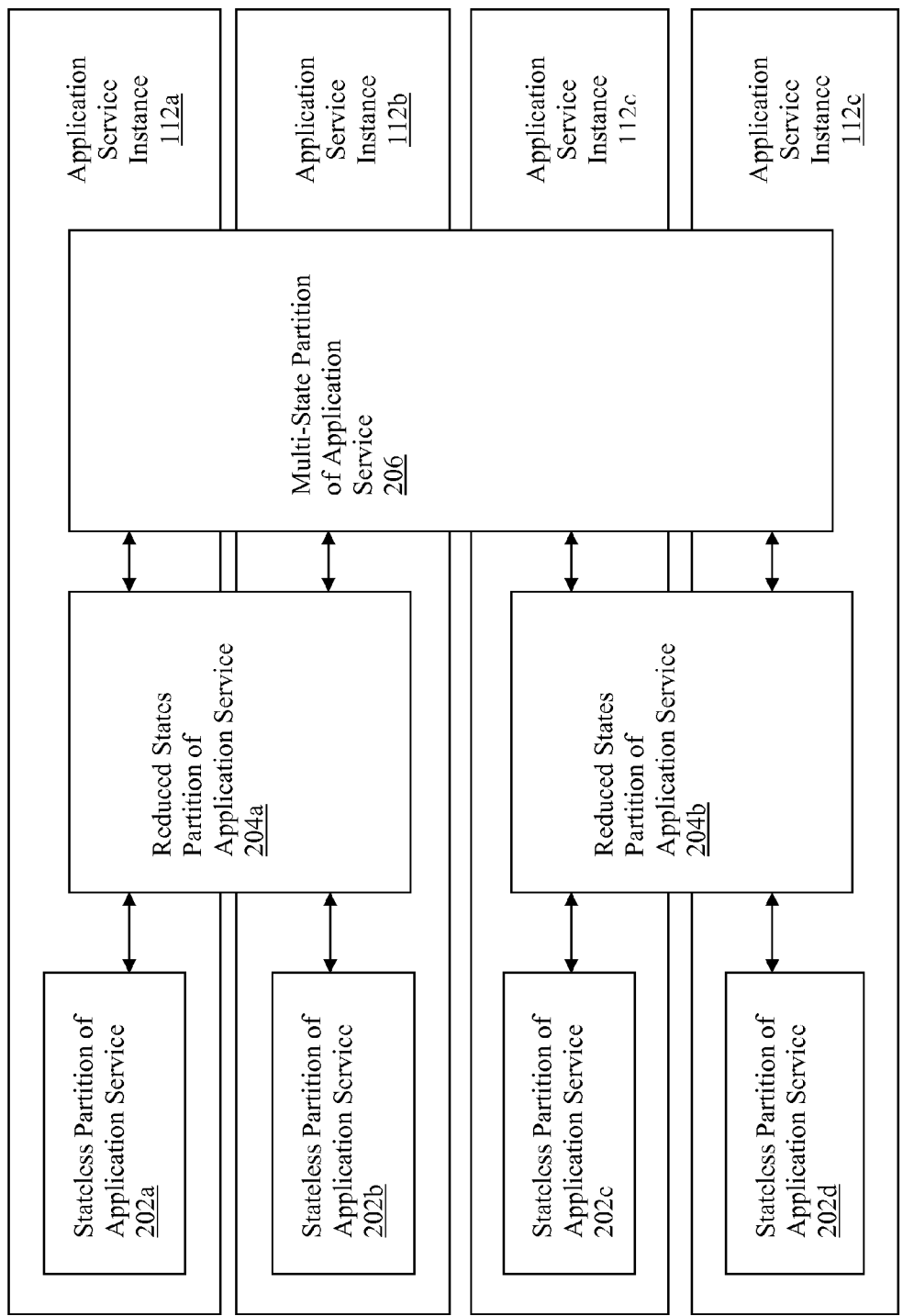
FIG. 2 illustrates exemplary instances of an application service.

Referring now to FIG. 2, wherein instances of application service of FIG. 1, in accordance with various embodiments of the present disclosure, are shown. As illustrated, in various embodiments, to ensure the latency sensitive service provided by the instances of application service 112 to client applications 122 may meet the performance requirement, application service 112 may be partitioned into one or more partitions, e.g., partitions 202*, 204* and 206 (where * denotes a, b, c, or d). For the illustrated embodiments, application service 112 may be partitioned into three (3) partitions, partition 202* with no state information, partition 204* with reduced or minimal state information, and partition 206 with a multitude of state information. Thus, an instance of application service, 112a, 112b, 112c or 112d may be comprised of an instance of partition 202*, e.g., 202a, 202b, 202c, or 202d, an instance of partition 204*, e.g., 204a or 204b, and partition 206, where there is only one instance.

Accordingly, a new instance of application service 112* may be deployed faster by creating a new instance of partition 202*(which is stateless), creating a new or using an existing instance of partition 204* (which has reduced or minimal state information), and using the existing instance of partition 206 (with multitude of state information). In this manner, dynamic real time adjustment of the deployment or the allocation of resources to the deployment of instances of application service 112 may be performed more effectively. Before further describing the present disclosure, it should be noted that the foregoing described embodiments are merely illustrative. The present disclosure may be practiced without partitioning application service 112, or partitioning application service 112 with more or less partitions, depending on the latency sensitivity of the service provided by application service 112.

In various embodiments, each virtual machine 110 may host an instance of a partition of application service 112. In other embodiments, each virtual machine 110 may host a number of instances of a partition of application service 112, and/or respective instances of a number of partitions of application service 112.

Figure 3:
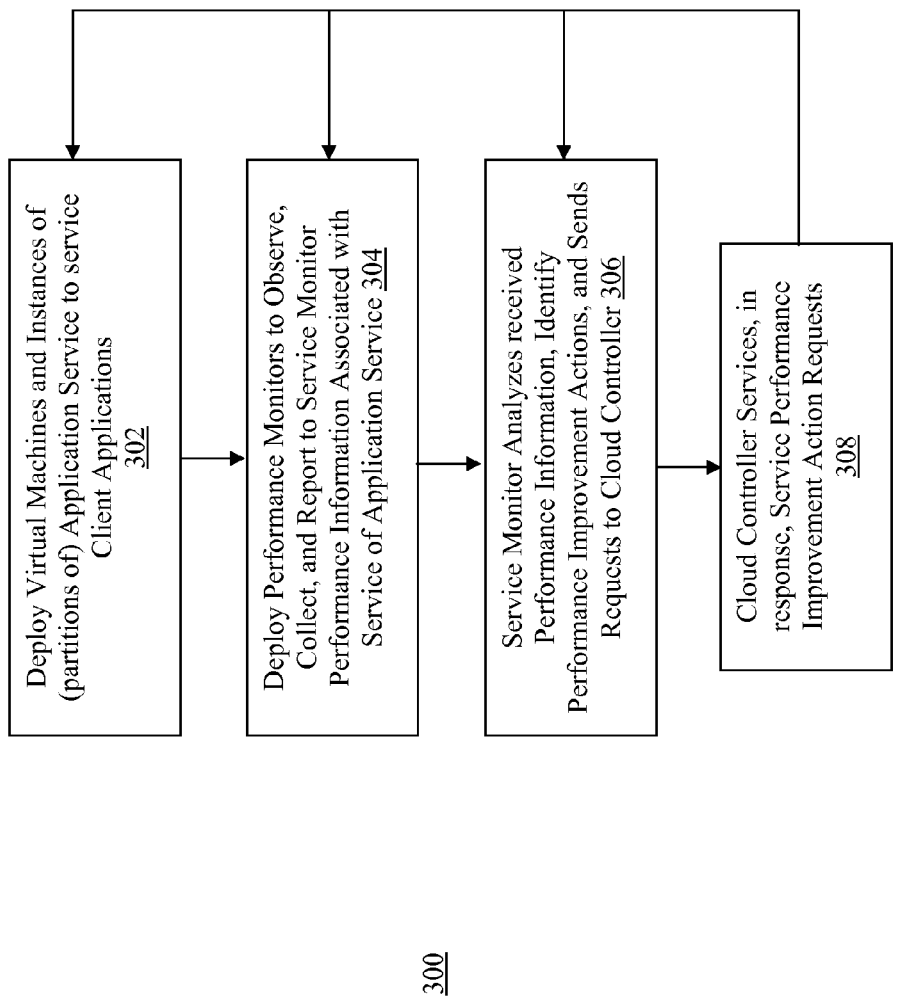
FIG. 3 illustrates a method of provisioning a performance sensitive application service.

Referring now to FIG. 3, wherein a method for provisioning a performance sensitive application service in a computing cloud, in accordance with various embodiments of the disclosure, is shown. As illustrated, method 300 may start at block 302, where virtual machines 110 and instances of (partitions of) application service 112 may be deployed on servers 104 of computing cloud 102 to service client applications 122. From block 302, method 300 may proceed to block 304, where performance monitors 114 may be deployed in virtual machines 110 or servers 104 to observe, collect and report to service monitor 140 performance information associated with the service provided to client applications 122 by application service 112. In various embodiments, performance monitors 114 may observe, collect and report to service monitor 142 performance information associated with different aspects of the transactions conducted with client applications 122 by application service 112. More specifically, in various embodiments, performance monitors 114 may observe, collect and report to service monitor 140 network latencies associated with (different aspects of) the transactions conducted with client applications 122 by application service 112.

From block 304, method 300 may proceed to block 306. At block 306, service monitor 140 may analyze the received performance information, and in response, identify one or more performance improvement actions. At block 306, service monitor 140 may send the identified performance improvement actions to cloud controller 130 and request cloud controller 130 to service the request and implement the actions. From block 306, method 300 may proceed to block 308. At block 308, cloud controller 130 may service the request and implement the actions to attempt to improve the performance of the service provided to client applications 122 by application service 112. In alternate embodiments, service monitor 140 may implement the identified performance improvement actions itself.

Additionally, as performance information changes, from block 308, the method may continue with operations of block 302, 304 or 306, forming a continuous loop. At block 302, additional virtual machines and/or instances of the application services may be deployed. At block 304. additional deployment of and/or reporting by performance monitors may be made. At block 306, additional requests for performance improvement actions may be sent.

In various embodiments, at block 306, service monitor 140 may identify the performance improvement actions based at least in part on the result of various optimization calculations performed by optimization function 142, using the received performance information associated with the service provided by application service 112. In various embodiments, optimization function 142 may solve an optimization of an objective function subject to resource, cost and/or latency constraints.

In various embodiments, the identifying operation at block 306 may include identifying a request of the computing cloud 102 to reroute transactions, previously routed to one instance of application service 112 to another instance of the application service 112. In various embodiments, the identifying operation at block 306 may include identifying a request of the computing cloud 102 to increase a computing resource allocated to one of the virtual machines 110 hosting an instance (of a partition) of the application service 112. Computing resources may include, but are not limited to, memory allocation, storage allocation, network bandwidth allocation, execution priority, transmission priority, and so forth.

In various embodiments, the identifying operation at block 306 may identify a request of the computing cloud 102 to migrate a virtual machine 110 deployed on one of the servers 104 to another one of servers 104. In various embodiments, the migration of a virtual machine 110 may be performed live, with the instance or instances (of the partition or partitions) of application service 112 continuing to service various ones of client application 122 without interruption. In various embodiments, the identifying operation at block 306 may identify a request of the computing cloud 102 to deploy another virtual machine 110, in addition to the deployed virtual machines 110, to operate another instance of the application service 112, and to reroute transactions that otherwise would be routed to the existing instances of the application service 112 to the newly deployed another instance of application service 112. In various embodiment, to facilitate faster initiation, cloud controller 130 may pre-position one or more images of (the partition or partitions of) application service 112.

Figure 4:
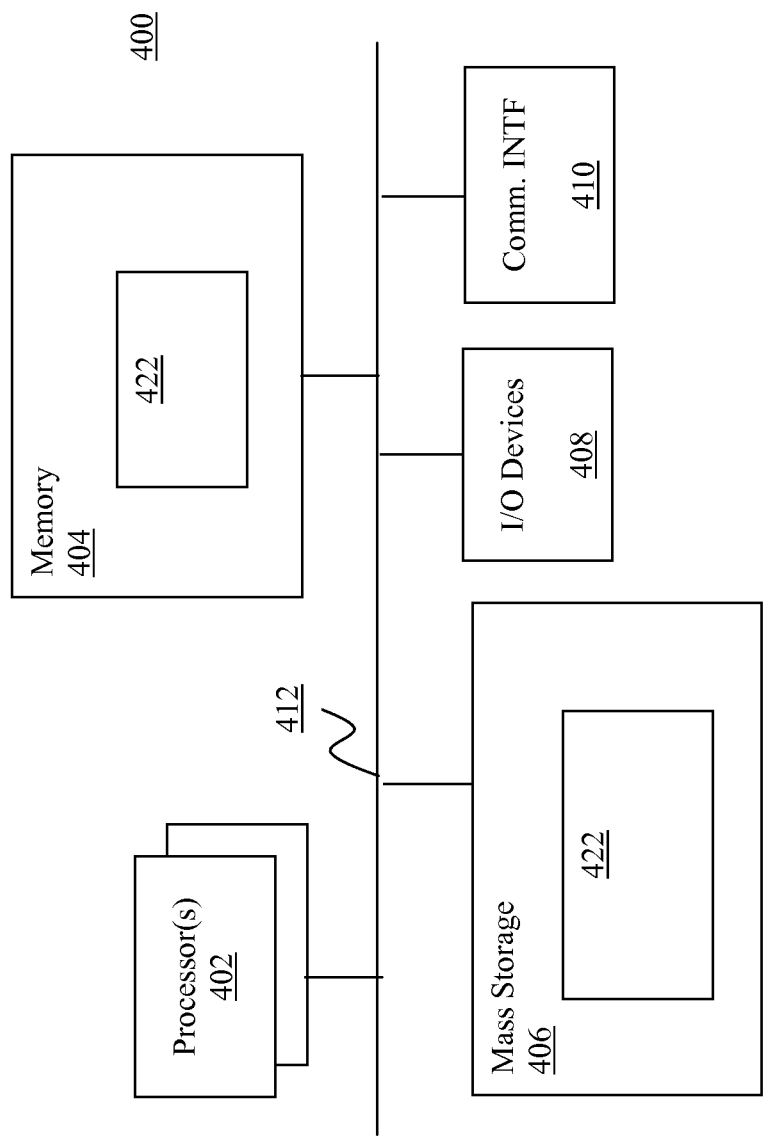
FIG. 4 illustrates an example computer system suitable for use as a server, a cloud controller, or a service monitor, where all of the foregoing illustrations are arranged in accordance with embodiments of the present disclosure.

FIG. 4 illustrates an example computer system suitable for use as a server, the cloud controller, and/or service monitor of FIG. 1, in accordance with various embodiments. As shown, computing system 400 includes a number of processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM) and so forth), input/output devices 408 (such as display, keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing the various components, such as virtual machines 110, (partitions of) application service 112, performance monitors 114, controller function 132, or optimization function 142, herein collectively denoted as 422. The various components may be implemented by assembler instructions supported by processor(s) 402 or high-level languages, such as, for example, C, that can be compiled into such instructions.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The constitution of these elements 402-412 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method for cloud computing, comprising:
   receiving, by a service monitor operating on a computing device, performance information associated with services provided by an application service with instances operating on a plurality of virtual machines deployed on a plurality of servers of a computing cloud, wherein the application service includes a plurality of partition instances having different amounts of state information and a single instance of the application service comprises at least two partition instances of the plurality of partition instances; and
   identifying, by the service monitor, based at least in part on the performance information received, one or more requests of the computing cloud to attempt to improve performance of the services provided by the application service, wherein to attempt to improve performance of the services includes deploying a new instance of the application service, and wherein the new instance of the application service comprises at least one existing partition instance of the plurality of partition instances and at least one newly instantiated partition instance.

2. The method of claim 1, wherein receiving comprises receiving performance information, by the service monitor, from respective performance monitors co-operating with the plurality of partition instances of the application service on the virtual machines or the servers.

3. The method of claim 1, wherein receiving comprises receiving, by the service monitor, network latency information associated with different aspects of transactions serviced by the application service.

4. The method of claim 1, wherein identifying comprises identifying, by the service monitor, a request of the computing cloud to reroute transactions, previously routed to a first of the instances of the application service to a second of the instances of the application service.

5. The method of claim 1, wherein identifying comprises identifying, by the service monitor, a request of the computing cloud to increase a computing resource allocated to one of the virtual machines hosting a partition instance of the plurality of partition instances.

6. The method of claim 1, wherein identifying comprises identifying, by the service monitor, a request of the computing cloud to live migrate a virtual machine deployed on a first server of the computing cloud to a second server of the computing cloud.

7. The method of claim 1, wherein identifying comprises identifying, by the service monitor, a request of the computing cloud to reroute transactions, that otherwise would be routed to existing instances of the application service, to the new instance of the application service.

8. The method of claim 1, wherein identifying comprises performing, by the service monitor, optimization calculations for a performance objective function, subject to one or more resource or cost constraints.

9. The method of claim 1, further comprising sending, by the service monitor, the one or more requests of the computing cloud to attempt to improve the performance of the application service, to a cloud controller of the computing cloud to effectuate the request.

10. An apparatus for cloud computing, comprising:
one or more processors; and
a tangible, non-transitory processor-readable storage medium coupled with the one or more processors, and having stored therein a plurality of programming instructions, configured to cause the apparatus, in response to execution of the programming instruction, to
receive performance information associated with services provided by an application service with instances respectively operating on a plurality of virtual machines deployed on a plurality of servers of a computing cloud, wherein the application service comprises a plurality of partition instances having different amounts of state information, and a single instance of the application service comprises at least two partition instances of the plurality of partition instances; and
identify, based at least in part on the performance information received, one or more requests of the computing cloud to attempt to improve performance of the services provided by the application service, wherein to attempt to improve performance of the services includes deploying a new instance of the application service, and wherein the new instance of the application service comprises at least one existing partition instance of the plurality of partition instances and at least one newly instantiated partition instance.

11. The apparatus of claim 10, wherein the programming instructions are configured to cause the apparatus, in response to execution of the programming instruction, to receive the performance information from respective performance monitors co-operating with the plurality of partition instances on the virtual machines or the servers.

12. The apparatus of claim 10, wherein the programming instructions are configured to cause the apparatus, in response to execution of the programming instruction, to receive network latency information associated with various aspects of transactions serviced by the application service.

13. The apparatus of claim 10, wherein the programming instructions are configured to cause the apparatus, in response to execution of the programming instruction, to identify a request of the computing cloud to reroute transactions, previously routed to a first of the instances of the application service operating on a first of the plurality of virtual machines to a second of the instances of the application service operating on a second of the plurality of virtual machines.

14. The apparatus of claim 10, wherein the programming instructions are configured to cause the apparatus, in response to execution of the programming instruction, to identify a request of the computing cloud to increase a computing resource allocated to one of the virtual machines hosting a partition instance of the plurality of partition instances.

15. The apparatus of claim 10, wherein the programming instructions are configured to cause the apparatus, in response to execution of the programming instruction, to identify a request of the computing cloud to live migrate a virtual machine deployed on a first server of the computing cloud to a second server of the computing cloud.

16. The apparatus of claim 10, wherein the programming instructions are configured to cause the apparatus, in response to execution of the programming instruction, to identify a request of the computing cloud to reroute transactions, that otherwise would be routed to the existing instances of the application service, to the new instance of the application service.

17. The apparatus of claim 10, wherein the programming instructions are configured to cause the apparatus, in response to execution of the programming instruction, to perform optimization calculations for a performance objective function, subject to one or more resource or cost constraints.

18. The apparatus of claim 10, wherein the programming instructions are configured to cause the apparatus, in response to execution of the programming instruction, to send the one or more requests of the computing cloud, to a cloud controller of the computing cloud.

19. An article of manufacture for cloud computing, comprising:
a tangible, non-transitory processor-readable storage medium; and
a plurality of programming instructions, configured to cause an apparatus, in response to execution of the programming instruction by the apparatus, to:
receive, from a service monitor, one or more requests of a computing cloud to attempt to improve performance of services provided by an application service with instances operating on a plurality of virtual machines deployed on a plurality of servers of the computing cloud, wherein the one or more requests were identified by the service monitor, based at least in part on performance information associated with aspects of the services provided by the application service, received by the service monitor from performance monitors co-deployed with the instances of the application service and, wherein the application service includes a plurality of partition instances having different amounts of state information, and a single instance of the application service comprises at least two partition instances of the plurality of partition instances; and
service the one or more requests to attempt to improve performance of the services provided by the instances of an application service, wherein to attempt to improve performance of the services includes deploying a new instance of the application service, and wherein the new instance of the application service comprises at least one existing partition instance of the plurality of partition instances and at least one newly instantiated partition instance.

20. The article of claim 19, wherein the one or more requests comprise at least a selected one of
- a request of the computing cloud to reroute transactions, previously routed to a first of the instances of the application service operating on a first of the plurality of virtual machines to a second of the instances of the application service operating on a second of the plurality of virtual machines;
- a request of the computing cloud to increase a computing resource allocated to one of the virtual machines;
- a request of the computing cloud to live migrate a virtual machine deployed on a first server of the computing cloud to a second server of the computing cloud; or
- to reroute transactions, that otherwise would be routed to the existing instances of the application service, to the new instance of the application service.

21. A system comprising:
- a plurality of servers configured to host a plurality of partition instances of an application service, wherein the plurality of partition instances contain different amounts of state information associated with instances of an application service of a cloud computing environment and a single instance of the application service comprises at least two partition instances of the plurality of partition instances; and
- a cloud computing controller coupled with the plurality of servers, the cloud computing controller configured, when executed on a processor of the cloud computing environment, to identify one or more service requests of the application service to attempt to improve performance, wherein to attempt to improve performance includes deploying a new instance of the application service, and wherein the new instance of the application service comprises at least one existing partition instance of the plurality of partition instances and at least one newly instantiated partition instance.

22. The system of claim 21, wherein the cloud computing controller is further configured, when executed on a processor of the cloud computing environment, to deploy a plurality of virtual machines on the plurality of servers and the plurality of servers are further configured to host the plurality of partition instances on the plurality of virtual machines.

23. The system of claim 22, wherein the plurality of virtual machines include performance monitors to collect performance information associated with the application service and report the performance information to the cloud computing controller and wherein the identification of one or more service requests of the application service to attempt to improve performance is based on the performance information.

24. The system of claim 21 further comprising a data store coupled with the plurality of servers, the data store configured to store the state information associated with the instances of the application service.

* * * * *